United States Patent
Naitou et al.

(10) Patent No.: US 7,120,345 B2
(45) Date of Patent: Oct. 10, 2006

(54) PROCESS FOR PRODUCING FLEXIBLE OPTICAL WAVEGUIDE

(75) Inventors: Ryuusuke Naitou, Osaka (JP); Kazunori Mune, Osaka (JP); Amane Mochizuki, Osaka (JP)

(73) Assignee: Nitto Denko Corporation, Osaka (JP)

( * ) Notice: Subject to any disclaimer, the term of this patent is extended or adjusted under 35 U.S.C. 154(b) by 0 days.

(21) Appl. No.: 11/177,332

(22) Filed: Jul. 11, 2005

(65) Prior Publication Data
US 2006/0008225 A1    Jan. 12, 2006

(30) Foreign Application Priority Data
Jul. 12, 2004 (JP) ............... P.2004-204916

(51) Int. Cl.
*G02B 6/10* (2006.01)
(52) U.S. Cl. .................... 385/129; 385/131
(58) Field of Classification Search ............ None
See application file for complete search history.

(56) References Cited

U.S. PATENT DOCUMENTS

| 5,362,357 | A | 11/1994 | Takei et al. |
| 6,549,709 | B1 | 4/2003 | De Dobbelaere et al. |
| 2002/0018633 | A1 | 2/2002 | Imaizumi |
| 2003/0087476 | A1 | 5/2003 | Oohata et al. |
| 2004/0003883 | A1 | 1/2004 | Kiuchi et al. |
| 2004/0013953 | A1 | 1/2004 | Mune et al. |

FOREIGN PATENT DOCUMENTS

| EP | 1 371 702 A1 | 12/2003 |
| EP | 1 385 027 A1 | 1/2004 |

OTHER PUBLICATIONS

Tohru Matsuura et al., (1999) "Heat-resistant flexible-film optical waveguides from fluorinated polyimides", Applied Optics, vol. 38, No. 6, pp. 966-971.
European Search Report dated Dec. 21, 2005.

*Primary Examiner*—Sung Pak
(74) *Attorney, Agent, or Firm*—Sughrue Mion, PLLC

(57) ABSTRACT

The present invention provides a process for producing a flexible optical waveguide which comprises the steps of: immersing a substrate having an optical waveguide formed thereon in water to thereby reduce adhesion between the optical waveguide and the substrate and then peeling the optical waveguide from the substrate; temporarily bonding the peeled optical waveguide to a surface of a pressure-sensitive adhesive layer containing a foaming agent; cutting the temporarily bonded optical waveguide into a given length; allowing the foaming-agent-containing pressure-sensitive adhesive layer after the cutting step to foam by heating, thereby reducing adhesion between the foaming-agent-containing pressure-sensitive adhesive layer and the optical waveguide; and peeling the optical waveguide cut into the given length from the foamed adhesive layer.

12 Claims, 4 Drawing Sheets

PROCESS FOR PRODUCING FLEXIBLE OPTICAL WAVEGUIDE

FIELD OF THE INVENTION

The present invention relates to a process for producing a flexible optical waveguide which is extensively used in optical communication, optical information processing, and other general optical fields.

BACKGROUND OF THE INVENTION

Optical waveguides are incorporated in optical waveguide devices, optical integrated circuits, and optical wiring boards and are in extensive use in optical communication, optical information processing, and other general optical fields. In the case of such an optical waveguide produced on a substrate such as, e.g., silicon or quartz, it is constituted of a core layer which transmits light and one or more cladding layers which have a lower refractive index than the core layer. More specifically, examples thereof include an optical waveguide 1 of a three-layer structure formed on a substrate 2 as shown in FIG. 11. This optical waveguide 1 comprises an undercladding layer 11 formed on the substrate 2, a core layer 12 formed on the undercladding layer 11, and an overcladding layer 13 which surrounds the core layer 12.

There are cases where an optical waveguide 1 is used in a flexible form. In such cases, the optical waveguide 1 described above is formed on a substrate 2 and is used after it is cut into a given length on the substrate 2 and then peeled from the substrate 2.

In general, fluorinated polyimides, which are excellent in both heat resistance and light transmission, are used as a material for forming the two cladding layers 11 and 13 or as a material for forming the core layer 12. However, the undercladding layer 11 (fluorinated polyimide) in such constitution has considerably reduced adhesion to the substrate 2 (e.g., a silicon wafer). There is hence a problem that separation between the substrate 2 and the undercladding layer 11 occurs during cutting and the optical waveguide 1 moves, resulting in a distorted cut surface. In case where the optical waveguide 1 has an end surface having a distorted shape, this arouses troubles in light transmission.

A technique for enhancing adhesion between the undercladding layer of an optical waveguide and a substrate so as to facilitate the cutting of optical waveguides has been proposed (see, for example, patent document 1). This technique comprises using as a substrate a glass substrate having a surface coated with vapor-deposited copper and forming an optical waveguide over the surface through an adhesive. In this technique, the optical waveguide is cut into a given length and thereafter the glass substrate with the cut optical waveguide is immersed in dilute hydrochloric acid to dissolve away the vapor-deposited copper on the glass substrate surface and thereby peel the optical waveguide from the glass substrate.

Patent Document 1: JP 08-313747 A (Examples 1 and 2)

However, the technique disclosed in patent document 1 has drawbacks that the peeling operation is accompanied by a danger because hydrochloric acid, which is a strong acid, is used for peeling and that workability is poor.

SUMMARY OF THE INVENTION

The invention has been made taking into account the foregoing problems.

Accordingly, an object of the invention is to provide a process for flexible-optical-waveguide production in which an optical waveguide can be cut while being tenaciously fixed and the peeling of the optical waveguide can be safely conducted.

Other objects and effects of the present invention will become apparent from the following description.

The above-described objects of the invention have been achieved by providing a process for producing a flexible optical waveguide which comprises the steps of:

immersing a substrate having an optical waveguide formed thereon in water to thereby reduce adhesion between the optical waveguide and the substrate and then peeling the optical waveguide from the substrate;

temporarily bonding the peeled optical waveguide to a surface of a pressure-sensitive adhesive layer containing a foaming agent;

cutting the temporarily bonded optical waveguide into a given length;

allowing the foaming-agent-containing pressure-sensitive adhesive layer after the cutting step to foam by heating, thereby reducing adhesion between the foamed adhesive layer and the optical waveguide; and peeling the optical waveguide cut into the given length from the foamed adhesive layer.

In this invention, the term optical waveguide means a thin-film layered product generally comprising a core layer which transmits light and a cladding layer which has a lower refractive index than the core layer and with which the core layer is surrounded, as stated above.

Namely, in the process of the invention for producing a flexible optical waveguide, an optical waveguide is first formed on a substrate in such a manner that the optical waveguide can be peeled from the substrate with water. Such a formation can be attained by a technique heretofore in use which employs ordinary materials (e.g., a silicon wafer or the like as a substrate material and a fluorinated polyimide or the like as an undercladding layer material). When an optical waveguide is formed by this technique, the undercladding layer of the optical waveguide has considerably poor adhesion to the substrate as stated above. Because of this, when this structure is immersed in water, the undercladding layer becomes easily peelable from the substrate. After peeling, the peeled optical waveguide is then bonded (temporarily bonded) to a surface of a pressure-sensitive adhesive layer containing a foaming agent to thereby fix the optical waveguide, with enhanced adhesion, to the pressure-sensitive adhesive layer containing a foaming agent. Subsequently, the optical waveguide in this bonded state is cut into a given length. In this operation, due to the high adhesion between the substrate and the optical waveguide, the cutting can be conducted stably and the resultant cut surface has a smooth finish. Thereafter, the foaming-agent-containing pressure-sensitive adhesive layer is allowed to foam by heating. As a result, the area of contact between the foamed adhesive layer and the optical waveguide decreases to reduce the adhesion. Consequently, the optical waveguide cut into a given length becomes easily peelable from the thus foamed adhesive layer.

In the process of the invention for producing a flexible optical waveguide, an optical waveguide is peeled from the substrate with water, subsequently temporarily bonded to a surface of a pressure-sensitive adhesive layer containing a foaming agent, cut, and then peeled from the foaming-agent-containing pressure-sensitive adhesive layer after the adhesive layer is allowed to foam by heating. Namely, since the peeling of the optical waveguide is carried out with water or heat, it can be safely conducted. Furthermore, since the optical waveguide is cut while being tightly attached to the foaming-agent-containing pressure-sensitive adhesive layer, the cutting can be conducted while keeping the optical waveguide in a tenaciously fixed state. As a result, a cut surface having a smooth finish is obtained and a flexible optical waveguide showing satisfactory light transmission can be produced.

Figure 1:
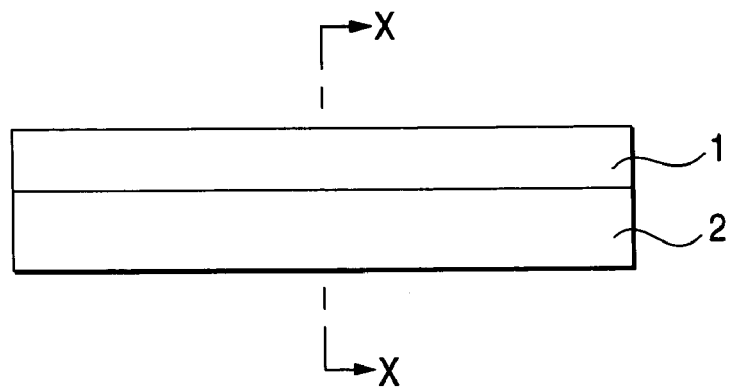
FIG. 1 is a view illustrating one embodiment of the process of the invention for producing a flexible optical waveguide.

The reference numerals and sign used in the drawings denote the followings, respectively:

1: Optical waveguide,
2: Substrate,
3: Support,
4: Pressure-sensitive adhesive layer containing a foaming agent,
4': Foamed adhesive layer,
11: Undercladding layer,
12: Core layer,
12a: Photosensitive polyimide resin precursor layer,
13: Overcladding layer,
C: Cut plain,
M: Photomask, and
L: Ultraviolet ray.

DETAILED DESCRIPTION OF THE INVENTION

An embodiment of the invention will be explained below in detail by reference to the drawings.

Figure 2:
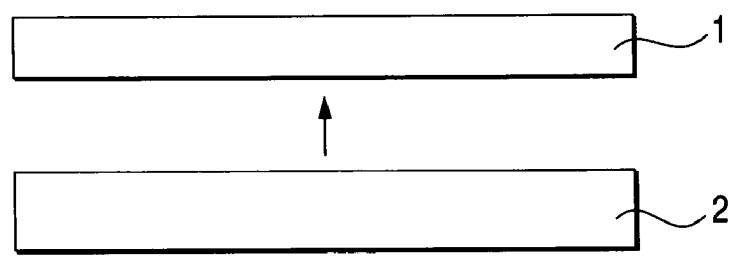
FIG. 2 is a view illustrating the embodiment of the process for producing a flexible optical waveguide.
Figure 3:
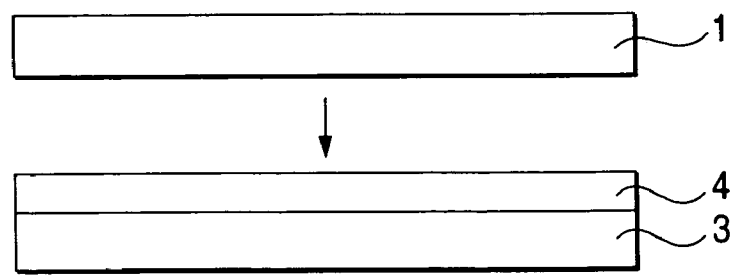
FIG. 3 is a view illustrating the embodiment of the process for producing a flexible optical waveguide.
Figure 4:
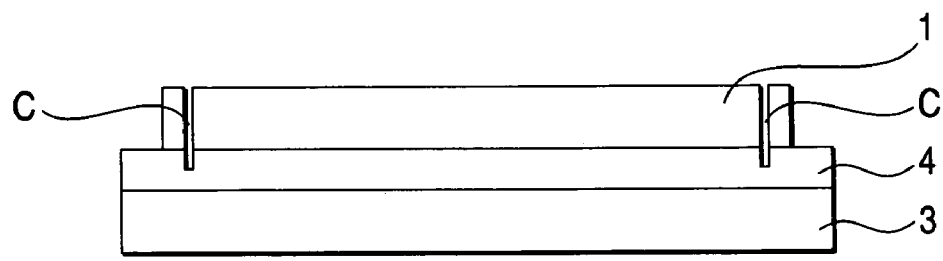
FIG. 4 is a view illustrating the embodiment of the process for producing a flexible optical waveguide.
Figure 5:
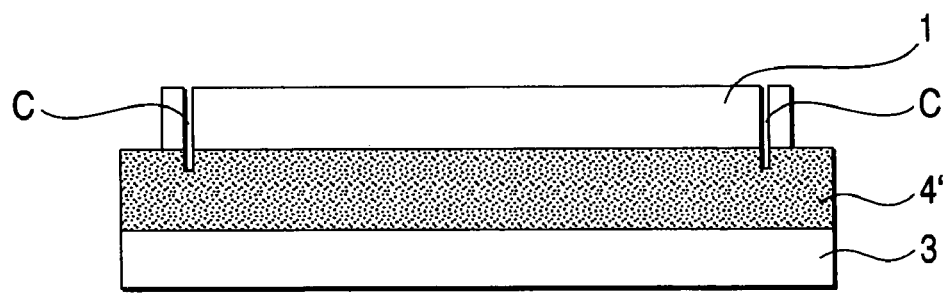
FIG. 5 is a view illustrating the embodiment of the process for producing a flexible optical waveguide.
Figure 6:
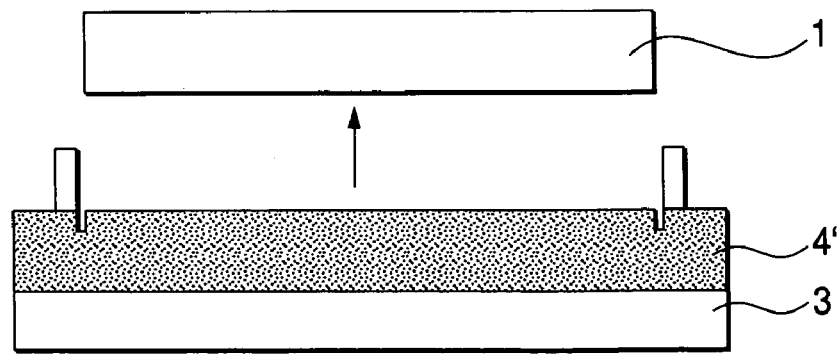
FIG. 6 is a view illustrating the embodiment of the process for producing a flexible optical waveguide.

FIGS. 1 to 6 show one embodiment of the process of the invention for producing a flexible optical waveguide. In this process for producing a flexible optical waveguide, an optical waveguide 1 is first formed on a substrate 2 as shown in FIG. 1 by a process heretofore in general use. Subsequently, the resultant structure is immersed in water to thereby peel the optical waveguide 1 from the substrate 2 as shown in FIG. 2. The optical waveguide 1 thus peeled is then bonded (temporarily bonded) to a surface of a pressure-sensitive adhesive layer 4 which contains a foaming agent and has been formed on a support 3, as shown in FIG. 3. Thereafter, the optical waveguide 1 in the bonded state (temporarily bonded state) is cut at two end parts so as to result in a given length as shown in FIG. 4 (in the figure, C indicates a cut plane). Subsequently, the foaming-agent-containing pressure-sensitive adhesive layer 4 is heated to foam as shown in FIG. 5. As a result of this foaming, the adhesion between the foamed adhesive layer 4' and the optical waveguide 1 decreases. Therefore, the optical waveguide 1 cut into the given length can be peeled from the foamed adhesive layer 4' as shown in FIG. 6. Thus, a flexible optical waveguide 1 can be obtained.

In this process for producing a flexible optical waveguide, the optical waveguide 1 bonded to the foaming-agent-containing pressure-sensitive adhesive layer 4 is in the state of being tenaciously fixed to the pressure-sensitive adhesive layer 4 during cutting and, hence, a cut surface having a smooth finish can be obtained. As a result, a flexible optical waveguide 1 showing satisfactory light transmission can be produced. Furthermore, since the peeling of the optical waveguide 1 from the substrate 2 is conducted by immersion in water and the peeling of the optical waveguide 1 from the foaming-agent-containing pressure-sensitive adhesive layer 4 is conducted by heating, the peeling of the optical waveguide 1 can be safely conducted without using a dangerous chemical or the like, and also the workability thereof is good.

More specifically, the peeling of the optical waveguide 1 from the substrate 2 by immersion in water can be attained by forming the optical waveguide 1 on a substrate 2 using ordinary materials heretofore in use, as stated above. Namely, any of a silicon wafer, silicon dioxide-coated silicon water, blue plate glass, synthetic quartz, polyimide resin, and the like may be used as a material for forming the substrate 2, and a fluorinated polyimide, which is excellent in both heat resistance and light transmission, or the like may be used as a material for forming the undercladding layer 11 of the optical waveguide 1. When such materials are used to form the undercladding layer 11 of the optical waveguide 1 and to form the substrate 2, adhesion between the undercladding layer 11 and the substrate 2 is considerably weak and the two can be easily separated from each other with water.

The foaming-agent-containing pressure-sensitive adhesive layer 4 comprises, for example, a material comprising a pressure-sensitive adhesive and a foaming agent incorporated therein. This layer 4 may be formed on a surface of a support 3 such as, e.g., a supporting table, supporting plate, or supporting sheet.

The pressure-sensitive adhesive is not particularly limited and a known one can be used, such as a rubber-based or acrylic one. Examples thereof include, for example, pressure-sensitive adhesives comprising: a base polymer having a weight-average molecular weight of 5,000 to 3,000,000 which is selected from rubbery polymers (such as natural rubber and various synthetic rubbers; polymers of alkyl esters of acrylic acid, methacrylic acid, or the like; acrylic polymers which are copolymers of about 50 to 99.5% by weight alkyl ester of acrylic acid, methacrylic acid, or the like with about 50 to 0.5% by weight other unsaturated monomer(s) copolymerizable therewith; and the like); and a crosslinking agent (such as, e.g., a polyisocyanate compound or a melamine alkyl ether compound) incorporated in the base polymer according to need. In the case where a crosslinking agent is incorporated, the amount thereof is generally about 0.1 to 10 parts by weight per 100 parts by weight of the base polymer.

The foaming agent is not particularly limited and a known one can be used. Examples thereof include: inorganic foaming agents represented by ammonium carbonate, ammonium hydrogen carbonate, sodium hydrogen carbonate, ammonium nitrite, sodium boron hydride, and azides; and organic foaming agents represented by azo compounds such as azobisisobutyronitrile, azodicarbonamide and barium azodicarboxylate, hydrazine compounds such as toluenesulfonylhydrazide, diphenyl sulfone 3,3'-disulfohydrazine, 4,4'-oxybis(benzenesulfohydrazide) and allylbis(sulfohydrazide), semicarbazide compounds such as p-toluylenesulfonylsemicarbazide and 4,4'-oxybis(benzenesulfonylsemicarbazide), triazole compounds such as 5-morpholyl-1,2,3,4-thiatriazole, and N-nitroso compounds such as N,N'-dinitrosopentamethylenetetramine and N,N'-dimethyl-N,N'-dinitrosoterephthalamide. It is preferred to use a microencapsulated foaming agent from the standpoints of dispersibility in the pressure-sensitive adhesive, etc. Examples of the microencapsulated foaming agent include commercial products such as Microsphere (F-30, F-50, and F-70, all manufactured by Matsumoto Yushi-Seiyaku Co., Ltd.). The amount of the foaming agent to be incorporated is generally 5 to 300 parts by weight per 100 parts by weight of the base polymer. However, the amount of the foaming agent is not limited to that range and is suitably determined, because foaming characteristics vary relatively considerably depending on the kind of the foaming agent used, heating conditions, etc. It is generally preferred to incorporate the foaming agent in such an amount that the volume of the foaming-agent-containing pressure-sensitive adhesive layer 4 increases at least twofold through foaming. It is also preferred to formulate the system so that the foaming treatment is completed by heating at 100 to 150° C. for about from 30 seconds to 1 minute.

The support 3, e.g., a supporting sheet, on which the foaming-agent-containing pressure-sensitive adhesive layer 4 is to be formed also is not particularly limited. In the case where a supporting sheet among various supporting materials is used as the support 3, the sheet preferably is a film which is relatively rigid and has self-supporting properties, such as a polyester film or polypropylene film, from the standpoints of strength, etc. The thickness thereof is preferably 10 to 500 μm.

The process of the invention for producing a flexible optical waveguide is explained below in more detail.

Figure 7:
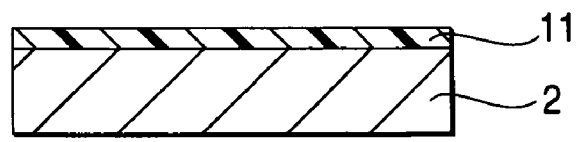
FIG. 7 is a view illustrating a common step in a process for optical-waveguide production.

First, an optical waveguide 1 is formed on a substrate 2 by a process heretofore in use. Specifically, as shown in FIG. 7, a polyimide resin precursor solution (poly(amic acid) solution) is applied to a substrate 2 in a thickness of preferably 1 to 30 μm, especially preferably 5 to 15 μm, on a dry basis and dried to thereby form a resin layer comprising a polyimide resin precursor composition. For the application, a general film-forming technique can be used such as, e.g., spin coating or casting. Subsequently, the resin layer is heated in an inert atmosphere to thereby complete removal of the solvent remaining in the resin layer and imidization of the polyimide resin precursor. Thus, an undercladding layer 11 made of a polyimide resin is formed on the substrate 2.

Figure 8:
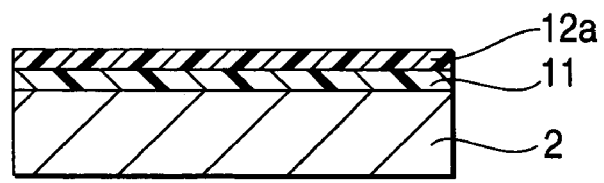
FIG. 8 is a view illustrating a common step in a process for optical-waveguide production.
Figure 9:
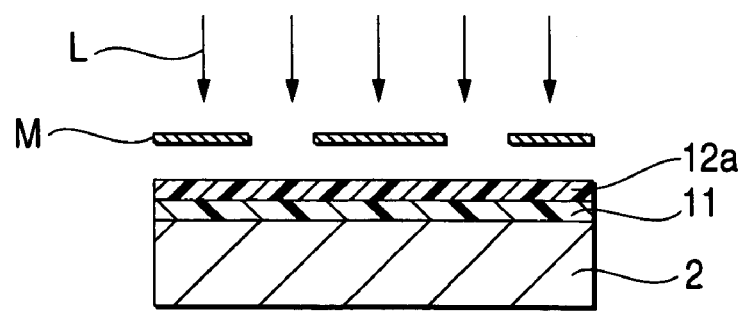
FIG. 9 is a view illustrating a common step in a process for optical-waveguide production.
Figure 10:
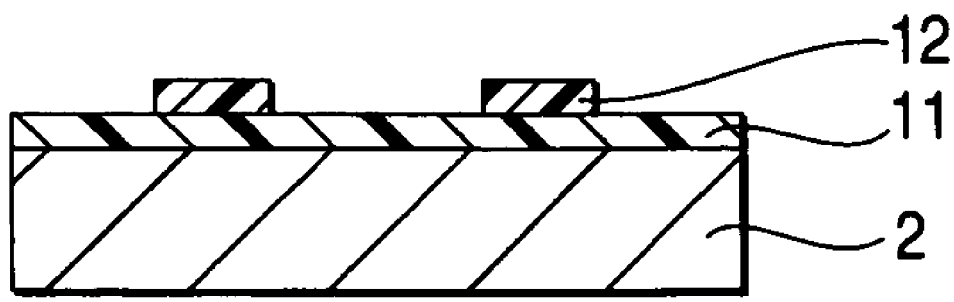
FIG. 10 is a view illustrating a common step in a process for optical-waveguide production.

Subsequently, as shown in FIG. 8, a photosensitive polyimide resin precursor solution (photosensitive poly(amic acid) varnish) which comprises materials giving a layer having a higher refractive index than the undercladding layer 11 is applied on the undercladding layer 11 in a thickness of preferably 2 to 30 μm, especially preferably 6 to 10 μm, on a dry basis. This coating layer is predried to form a photosensitive polyimide resin precursor layer 12a which becomes a core layer 12 later. Subsequently, a photomask M is placed over the photosensitive polyimide resin precursor layer 12a so as to obtain a desired pattern and, from above the photomask M, ultraviolet L is applied as shown in FIG. 9. In the invention, when the exposure amount in the irradiation with ultraviolet L is 5 to 50 mJ/cm$^2$, sufficient resolution is attained. Thereafter, the heat treatment after exposure which is called post exposure bake (PEB) is conducted in order to complete the photoreaction, and development with a developing solution (wet processing technique) is conducted. The desired pattern thus obtained by the development is usually subjected to a heat treatment in order to imidize the pattern. This treatment is performed at a temperature of generally 300 to 400° C. to conduct solvent removal and curing reaction (cure) under vacuum or in a nitrogen atmosphere. Through the imidization thus conducted, a patterned core layer 12 comprising a polyimide resin is formed as shown in FIG. 10.

The developing solution for use in the development is not particularly limited. For example, an alkaline aqueous solution of an alcohol is used. More specifically, it is preferred to use a mixed aqueous solution of tetramethylammonium hydroxide and ethanol from the standpoints of satisfactory resolution and ease of the regulation of development rate. In the mixed aqueous solution, the proportion of tetramethylammonium hydroxide and that of ethanol are preferably regulated so as to be in the ranges of 2 to 10% by weight and 40 to 50% by weight, respectively.

Figure 11:
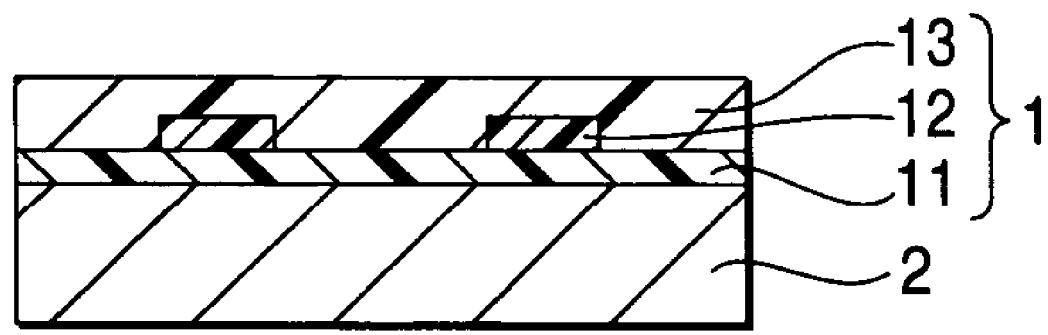
FIG. 11 is a sectional view taken on the line X—X in FIG. 1.

Subsequently, a polyimide resin precursor solution which comprises layer-forming materials giving a layer having a lower refractive index than the core layer 12 is applied over the core layer 12 in such an amount as to result in a maximum film thickness on a dry basis of preferably 1 to 30 μm, especially preferably 5 to 15 μm, and then dried to thereby form a resin layer comprising a polyimide resin precursor composition as shown in FIG. 11. This resin layer is subsequently heated in an inert atmosphere as in the case of the undercladding layer 11 to thereby complete removal of the solvent remaining in the resin layer and imidization of the polyimide resin precursor. Thus, an overcladding layer 13 comprising a polyimide resin is formed so as to surround the core layer 12 to thereby form an optical waveguide 1 on the substrate 2 as shown in the figure. The procedures described above ending with the formation of the overcladding layer 13 are common to a process for optical-waveguide production heretofore in general use. Incidentally, FIG. 11 is a sectional view taken on the line X—X of FIG. 1.

The feature of the invention resides in the subsequent steps. Namely, the substrate 2 having the optical waveguide 1 formed thereon in the manner described above (see FIG. 1) is immersed in water to thereby reduce adhesion between the optical waveguide 1 and the substrate 2. At the time when the substrate 2 having the optical waveguide 1 is still in the water or immediately after it is taken out of the water, the optical waveguide 1 is peeled from the substrate 2 as shown in FIG. 2. After the peeling, the water present on the surfaces of the optical waveguide 1 is removed by drying, etc.

On the other hand, a pressure-sensitive adhesive containing a foaming agent is applied on a surface of the support 3 to form a foaming-agent-containing pressure-sensitive adhesive layer 4 as shown in FIG. 3. The thickness thereof is regulated to preferably 10 to 300 μm, especially preferably 25 to 200 μm, from the standpoints of adhesion improvement and stability during cutting.

The optical waveguide 1 is pressed against and bonded (temporarily bonded) to the surface of the foaming-agent-containing pressure-sensitive adhesive layer 4. After the optical waveguide 1 is thus fixed, the optical waveguide 1 in this temporarily bonded state is cut into a given length as shown in FIG. 4 (in the figure, C indicates a cut plane). The cutting device to be used for this cutting is not particularly limited, and examples thereof include a dicing saw.

Subsequently, the resultant structure in which the optical waveguide 1 has been cut is heated. This heating foams the foaming-agent-containing pressure-sensitive adhesive layer 4 as shown in FIG. 5. As a result, the area of contact with the optical waveguide 1 decreases and, hence, the adhesion between the foamed adhesive layer 4' and the optical waveguide 1 decreases. Consequently, the optical waveguide 1 becomes easily peelable from the foamed adhesive layer 4' as shown in FIG. 6. The optical waveguide 1 is peeled off to give a flexible optical waveguide 1. The device to be used for the heating is not particularly limited, and examples thereof include a dry oven and a hot plate. It is preferred that the heating be conducted at 100 to 150° C. for about 30 seconds to 1 minute as stated above.

Examples of the flexible optical waveguide 1 thus obtained include straight optical waveguides, bend optical waveguides, crossing optical waveguides, Y-branched optical waveguides, slab optical waveguides, Mach-Zehnder type optical waveguides, AWG (alley wave guide) type optical waveguides, grating optical waveguides, and optical waveguide lenses. Examples of optical elements employing such optical waveguides include wavelength filters, optical switches, optical branch units, optical multiplexers, optical multiplexers/demultiplexers, optical amplifiers, wavelength modulators, wavelength division multiplexers, optical splitters, directional couplers, and optical transmission modules having a laser diode or photodiode hybrid-integrated therewith.

The present invention will be illustrated in greater detail with reference to the following Examples, but the invention should not be construed as being limited thereto.

EXAMPLE

Poly(Amic Acid) Solution

In a 500-mL separable flask equipped with a stirrer, 26.66 g (0.06 mol) of 2,2-bis(3,4-dicarboxyphenyl)hexafluoropropane dianhydride (6FDA) as an acid dianhydride and 18.54 g (0.058 mol) of 2,2'-bis(trifluoromethyl)benzidine (BTFB) were dissolved in 182.85 g (2.10 mol) of N,N-dimethylacetamide (DMAC) as an organic solvent. Thereafter, the resultant solution was stirred at room temperature (25° C.) for 10 hours to thereby produce a poly(amic acid) solution (polyimide resin precursor solution).

Subsequently, the poly(amic acid) solution was applied on a 525 μm-thick silicon wafer substrate by spin coating in such an amount as to result in a thickness after heat treatment of 15 μm. The solution applied was dried at 90° C. to thereby form a resin layer comprising a polyimide resin precursor composition. Thereafter, the resin layer was heated at 385° C. under vacuum to thereby complete removal of the solvent remaining in the resin film and imidization of the polyimide resin precursor. Thus, an undercladding layer having a thickness of 15 μm (refractive index, 1.51) was formed on the silicon wafer substrate.

Subsequently, a photosensitive polyimide resin precursor solution as a material for core layer formation was prepared in the following manner in order to form a core layer on the undercladding layer. To the poly(amic acid) solution described above was added 1-ethyl-3,5-dimethoxycarbonyl-4-(2-nitrophenyl)-1,4-dihydropyridine as a photosensitizer in an amount of 2% by weight based on the solid component of the poly(amic acid) solution. Polyethylene glycol dimethyl ether having a weight-average molecular weight of 500 was further added thereto as a dissolution control agent in an amount of 30% by weight based on the solid component of the poly(amic acid) solution. Thus, a photosensitive polyimide resin precursor composition was obtained as a solution (photosensitive polyimide resin precursor solution).

Thereafter, the photosensitive polyimide resin precursor solution was applied on the undercladding layer and dried at 90° C. in the same manner as in the formation of the undercladding layer to thereby form a photosensitive polyimide resin precursor layer comprising a photosensitive polyimide resin precursor composition. A given photomask (line width 6 μm×length 50 mm×interval 0.2 mm) was placed on this photosensitive polyimide resin precursor layer, and exposure with ultraviolet in an amount of 30 mJ/cm$^2$ was carried out from above the photomask. Furthermore, post-exposure heating was conducted at 170° C. for 10 minutes.

An aqueous solution containing 2 to 10% tetramethylammonium hydroxide and 40 to 50% ethanol was subsequently used as a developing solution to develop the layer at 35° C. and dissolve away the unexposed areas. Thereafter, the layer was rinsed with water to thereby form a pattern having a negative image. This pattern was heated at 330° C. under vacuum to thereby complete imidization of the polyimide resin precursor. Thus, a core layer (refractive index, 1.52) having a given pattern was formed. The core layer formed had a sectional size of 6 μm×6 μm.

Subsequently, the poly(amic acid) solution (polyimide resin precursor solution) described above was used as a material for forming an overcladding layer over the core layer, in the same manner as in the formation of the undercladding layer. Namely, the poly(amic acid) solution was applied by spin coating in such an amount as to result in a thickness after heat treatment of 15 μm and dried at 90° C. to thereby form a resin film comprising a polyimide resin precursor composition. Thereafter, this resin film was heated at 330° C. under vacuum to thereby complete removal of the solvent remaining in the resin film and imidization of the polyimide resin precursor. As a result, an overcladding layer (refractive index, 1.51) having a maximum thickness of 20 μm was formed so as to surround the core layer. Thus, an optical waveguide made of a polyimide resin was produced on the silicon wafer substrate.

The silicon wafer substrate having the optical waveguide formed thereon was immersed in 25° C. water for 5 minutes, and the optical waveguide was peeled from the substrate in the water. Thereafter, the optical waveguide was taken out of the water and allowed to dry naturally in a 25° C. atmosphere.

Pressure-Sensitive Adhesive Containing Foaming Agent

A hundred parts by weight of a copolymer (weight-average molecular weight, about 800,000) produced from 100 parts by weight of butyl acrylate and 2 parts by weight of acrylic acid was dissolved in toluene together with 2 parts by weight of a polyisocyanate crosslinking agent and 30 parts by weight of Microsphere (F-30, manufactured by Matsumoto Yushi-Seiyaku Co., Ltd.). The resultant mixture was homogenized by stirring to prepare a foaming-agent-containing pressure-sensitive adhesive.

Subsequently, the foaming-agent-containing pressure-sensitive adhesive was applied to one side of a polyester film having a thickness of 100 μm and then allowed to dry naturally in a 25° C. atmosphere to thereby form a foaming-agent-containing pressure-sensitive adhesive layer having a thickness of 30 μm.

The optical waveguide was pressed against and temporarily bonded to the surface of the foaming-agent-containing pressure-sensitive adhesive layer. The optical waveguide in this temporarily bonded state was cut at two end parts with a dicing saw so as to result in an optical-waveguide length of 40 mm. This cutting was conducted at such a depth that the dicing saw blade reached the foaming-agent-containing pressure-sensitive adhesive layer.

Subsequently, the resultant structure in which the optical waveguide had been thus cut was heated with a hot plate at 120° C. for 30 seconds. As a result, the foaming-agent-containing pressure-sensitive adhesive layer foamed. Thereafter, the structure was taken out of the heater, and the optical waveguide which had been cut at the two end parts was pinched with a pincette and peeled from the foamed adhesive layer. This peeling was easy.

The flexible optical waveguide thus obtained was examined for light propagation loss by the cutback method at a wavelength of 1.55 μm. As a result, the optical waveguide was found to have a light propagation loss of 0.5 dB/cm, which is an extremely small value. Namely, this Example could yield a flexible optical waveguide having satisfactory light transmission.

While the present invention has been described in detail and with reference to specific embodiments thereof, it will be apparent to one skilled in the art that various changes and modifications can be made therein without departing from the spirit and scope thereof.

The present application is based on Japanese Patent Application No. 2004-204916 filed Jul. 12, 2004, the contents thereof being herein incorporated by reference.

What is claimed is:

1. A process for producing a flexible optical waveguide which comprises the steps of:
   immersing a substrate having an optical waveguide formed thereon in water to thereby reduce adhesion between the optical waveguide and the substrate and then peeling the optical waveguide from the substrate;
   temporarily bonding the peeled optical waveguide to a surface of a pressure-sensitive adhesive layer containing a foaming agent;
   cutting the temporarily bonded optical waveguide into a given length;
   allowing the foaming-agent-containing pressure-sensitive adhesive layer after the cutting step to foam by heating, thereby reducing adhesion between the foaming-agent-containing pressure-sensitive adhesive layer and the optical waveguide; and
   peeling the optical waveguide cut into the given length from the foamed adhesive layer.

2. The process for producing a flexible optical waveguide of claim 1, wherein the substrate comprises at least one member selected from the group consisting of a silicon wafer, a silicon wafer coated with silicon dioxide, a blue plate glass, a synthetic quartz, and a polyimide resin.

3. The process for producing a flexible optical waveguide of claim 1, wherein the optical waveguide formed on the substrate comprises at least:
   an undercladding layer disposed on the substrate; and
   a patterned core layer disposed on the undercladding layer.

4. The process for producing a flexible optical waveguide of claim 3, wherein the undercladding layer comprises a fluorinated polyimide.

5. The process for producing a flexible optical waveguide of claim 3, wherein the patterned core layer comprises a polyimide having a refractive index higher than that of the undercladding layer.

6. The process for producing a flexible optical waveguide of claim 3, wherein the optical waveguide further comprises an overcladding layer disposed to surround the patterned core layer.

7. The process for producing a flexible optical waveguide of claim 6, wherein the overcladding layer comprises a polyimide having a refractive index lower than that of the patterned core layer.

8. The process for producing a flexible optical waveguide of claim 1, wherein the foaming agent contained in the pressure-sensitive adhesive layer is microencapsulated.

9. The process for producing a flexible optical waveguide of claim 1, wherein the heating for allowing the foaming-agent-containing pressure-sensitive adhesive layer to foam is carried out at 100° C. to 150° C. for about 30 seconds to 1 minute.

10. The process for producing a flexible optical waveguide of claim 1, wherein the foaming-agent-containing pressure-sensitive adhesive layer is supported by a support.

11. The process for producing a flexible optical waveguide of claim 10, wherein the support comprises a polyester or a polypropylene.

12. The process for producing a flexible optical waveguide of claim 10, wherein the support has a thickness of from 10 to 500 μm.

* * * * *